United States Patent
Berkman

(10) Patent No.: US 7,796,025 B2
(45) Date of Patent: Sep. 14, 2010

(54) POWER LINE COMMUNICATION DEVICE AND METHOD

(75) Inventor: William H. Berkman, New York, NY (US)

(73) Assignee: Current Technologies, LLC, Germantown, MD (US)

( * ) Notice: Subject to any disclaimer, the term of this patent is extended or adjusted under 35 U.S.C. 154(b) by 1123 days.

(21) Appl. No.: 11/388,986

(22) Filed: Mar. 27, 2006

(65) Prior Publication Data

US 2007/0222579 A1 Sep. 27, 2007

(51) Int. Cl.
*H04Q 1/30* (2006.01)
*G08B 1/08* (2006.01)
*H04M 11/04* (2006.01)

(52) U.S. Cl. ............................. 340/538.16; 340/310.16

(58) Field of Classification Search ............ 340/538.16, 340/538.15, 538, 310.16; 702/58, 62
See application file for complete search history.

(56) References Cited

U.S. PATENT DOCUMENTS

| | | |
|---|---|---|
| 3,911,415 A | 10/1975 | Whyte |
| 3,942,168 A | 3/1976 | Whyte |
| 3,942,170 A | 3/1976 | Whyte |
| 3,944,723 A | 3/1976 | Fong |
| 3,967,264 A | 6/1976 | Whyte et al. |
| 3,973,087 A | 8/1976 | Fong |
| 3,973,240 A | 8/1976 | Fong |
| 4,004,110 A | 1/1977 | Whyte |
| 4,250,489 A | 2/1981 | Dudash et al. |
| 4,475,209 A | 10/1984 | Udren |
| 4,599,598 A | 7/1986 | Komoda et al. |
| 4,638,298 A | 1/1987 | Spiro |
| 4,642,607 A | 2/1987 | Strom et al. |

(Continued)

FOREIGN PATENT DOCUMENTS

EP  1 251 646 A2  10/2002

(Continued)

OTHER PUBLICATIONS

"Emetcon Automated Distribution System: Communications Guide", *Westinghouse ABB Power T & D Company Technical Manual 42-6001A,,* (Sep. 1989),1-55.

(Continued)

*Primary Examiner*—John A Tweel, Jr.
(74) *Attorney, Agent, or Firm*—Mel Barnes; Capital Legal Group, LLC

(57) ABSTRACT

A power line communication device configured to facilitate communications over a low voltage power line between a downstream user device and an external power line communication device is provided. In one embodiment, the device may include a communication module configured to communicate over a low voltage power line and a controller configured to control the module. The controller is configured to operate the module in a first configuration in which all repeating is disabled; and a second configuration wherein upstream repeating is enabled and downstream repeating is disabled. The controller may transition from the first configuration to the second configuration in response to a command received via the low voltage power line or upon determining that a triggering event has been detected such as an unacceptable data rate, error rate, or noise detection. In some embodiments, the device may form part of a utility meter and also transmit utility data to the power line communication device.

39 Claims, 4 Drawing Sheets

U.S. PATENT DOCUMENTS

| | | |
|---|---|---|
| 5,726,980 A | 3/1998 | Rickard |
| 5,818,821 A | 10/1998 | Schurig |
| 5,870,016 A | 2/1999 | Shrestha |
| 5,949,327 A | 9/1999 | Brown |
| 5,978,371 A | 11/1999 | Mason, Jr. et al. |
| 6,346,875 B1 | 2/2002 | Puckette et al. |
| 6,373,377 B1 | 4/2002 | Sacca et al. |
| 6,522,650 B1 | 2/2003 | Yonge, III et al. |
| 6,624,532 B1 | 9/2003 | Davidow et al. |
| 6,687,574 B2 | 2/2004 | Pietrowicz et al. |
| 6,885,674 B2 | 4/2005 | Hunt et al. |
| 6,965,303 B2 | 11/2005 | Mollenkopf |
| 6,977,578 B2 | 12/2005 | Kline |
| 6,980,091 B2 | 12/2005 | White et al. |
| 6,993,317 B2 | 1/2006 | Belsak, Jr. |
| 6,998,962 B2 | 2/2006 | Cope et al. |
| 7,224,272 B2 | 5/2007 | White et al. |
| 7,308,103 B2 | 12/2007 | Corcoran et al. |
| 7,468,657 B2 * | 12/2008 | Yaney ........................ 340/538 |
| 7,525,423 B2 * | 4/2009 | Berkman et al. ............ 340/538 |
| 7,626,497 B2 * | 12/2009 | Mollenkopf ................ 340/538 |
| 2002/0109585 A1 | 8/2002 | Sanderson |
| 2003/0224784 A1 | 12/2003 | Hunt et al. |
| 2004/0066283 A1 | 4/2004 | Manis et al. |
| 2004/0067745 A1 | 4/2004 | Belsak |
| 2004/0090312 A1 | 5/2004 | Manis et al. |
| 2004/0110483 A1 | 6/2004 | Mollenkopf |
| 2004/0135676 A1 | 7/2004 | Berkman et al. |
| 2004/0157551 A1 | 8/2004 | Gainey et al. |
| 2004/0163128 A1 | 8/2004 | Phillips et al. |
| 2004/0168199 A1 | 8/2004 | Phillips et al. |
| 2004/0242185 A1 | 12/2004 | Lee |
| 2005/0033534 A1 | 2/2005 | Villicaana et al. |
| 2005/0040809 A1 | 2/2005 | Uber, III et al. |
| 2005/0068223 A1 | 3/2005 | Vavik |
| 2005/0129097 A1 | 6/2005 | Strumpf et al. |
| 2005/0168326 A1 | 8/2005 | White et al. |
| 2005/0200459 A1 | 9/2005 | White, II |
| 2005/0220004 A1 | 10/2005 | Vollmer et al. |
| 2005/0273282 A1 | 12/2005 | Mollenkopf |
| 2005/0285720 A1 | 12/2005 | Cope et al. |
| 2006/0044076 A1 | 3/2006 | Law |
| 2006/0045105 A1 | 3/2006 | Dobosz et al. |
| 2006/0073805 A1 | 4/2006 | Zumkeller et al. |
| 2006/0077906 A1 | 4/2006 | Maegawa et al. |
| 2006/0079198 A1 | 4/2006 | Sanderson |
| 2006/0097573 A1 | 5/2006 | Gidge et al. |
| 2006/0140260 A1 | 6/2006 | Wasaki et al. |
| 2006/0221995 A1 | 10/2006 | Berkman |
| 2006/0291546 A1 | 12/2006 | Zitting |
| 2006/0291575 A1 | 12/2006 | Berkman et al. |
| 2007/0001821 A1 | 1/2007 | Berkman |
| 2007/0002876 A1 | 1/2007 | Berkman et al. |
| 2007/0189182 A1 | 8/2007 | Berkman et al. |
| 2007/0201494 A1 | 8/2007 | Lou et al. |
| 2007/0222579 A1 | 9/2007 | Berkman |
| 2007/0223381 A1 | 9/2007 | Radtke |
| 2008/0012724 A1 | 1/2008 | Corcoran |
| 2008/0037784 A1 | 2/2008 | Corcoran et al. |
| 2009/0187358 A1* | 7/2009 | Deaver, Sr. .................. 702/58 |

FOREIGN PATENT DOCUMENTS

| | | |
|---|---|---|
| GB | 2 293 950 A | 4/1996 |
| JP | 10200544 A2 | 7/1998 |
| WO | WO-03/030396 A2 | 4/2003 |
| WO | WO-2004102868 | 11/2004 |

OTHER PUBLICATIONS

Jee, G et al., "Demonstration of the Technical Viability of PLC Systems on Medium- and Low-Voltage Lines in the United States", *IEEE Communication Magazine*, (May 2003),108-112.

"Outlook Conference 2004: Amperion Deployment Overview", *Primen Conference*, (May 7, 2004),1-10.

* cited by examiner

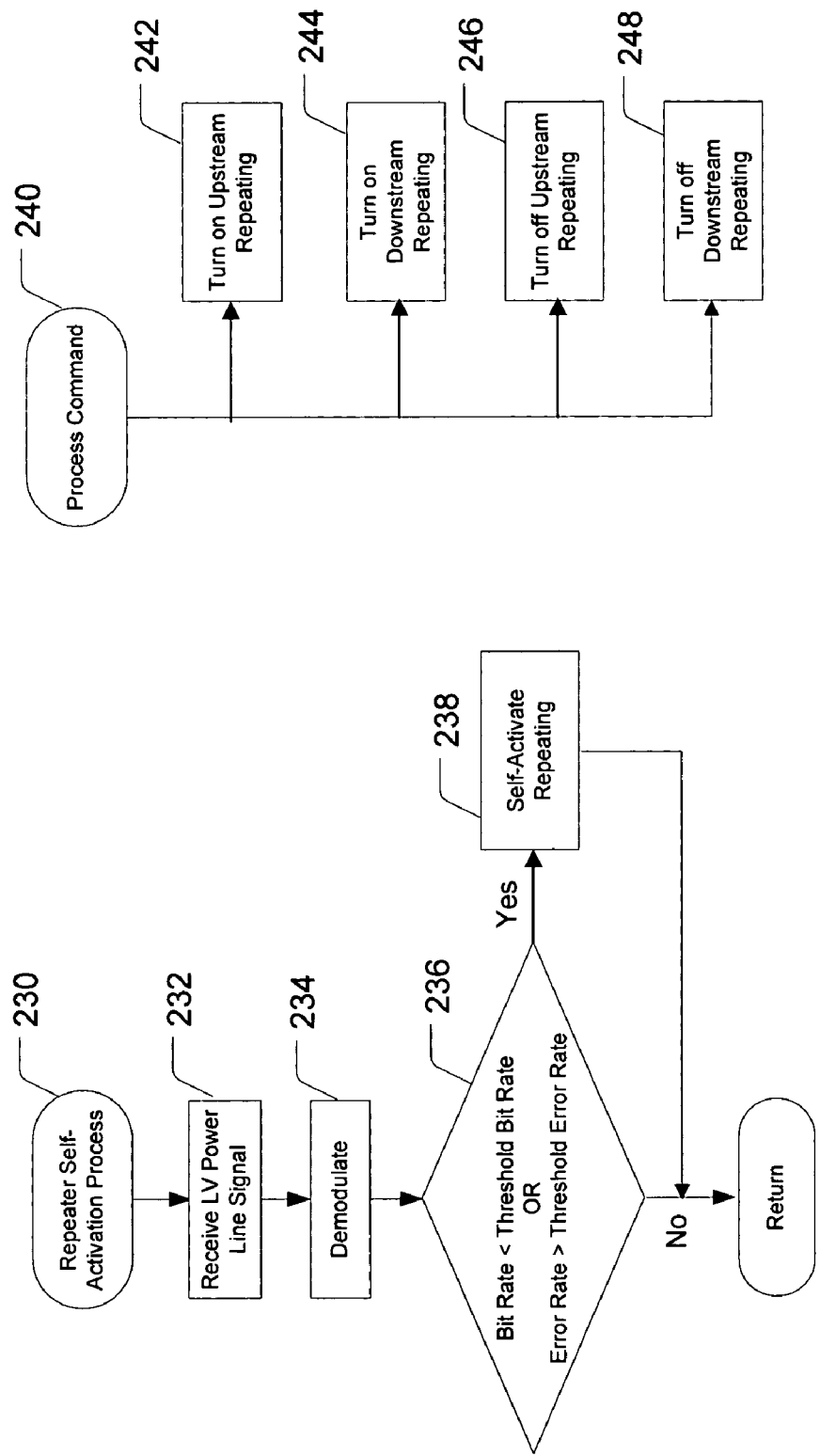

POWER LINE COMMUNICATION DEVICE AND METHOD

FIELD OF THE INVENTION

The present invention generally relates to methods and systems of power line data communication systems, and more particularly to power line communications over low voltage power lines.

BACKGROUND OF THE INVENTION

Using the power system infrastructure to deliver data communication services is becoming increasingly viable. For example, commercial services are available in many areas for delivering broadband internet access over the power lines. Power line communication system (PLCS) communications, such as broadband communications, may be communicated over medium voltage power lines. Repeating devices may receive the communications and transmit the communications further along the medium voltage power lines. To avoid signal deterioration at distribution transformers along the power line pathways, bypass devices may be coupled to the medium voltage power lines near transformers. The bypass device may communicate with user devices via low voltage power lines, which may extend from a distribution transformer to a plurality of customer premises.

Within a customer premises there are internal low voltage power lines. A subscriber of a power line communication system (PLCS) couples a user device to the internal low voltage power lines to transmit and receive power line communications, (e.g., to receive data from the internet and to transmit data to (through) the internet). Thus, broadband over power line ("BPL") data signals may propagate through the internal low voltage power lines, over the external low voltage power lines which couple the premises to a distribution transformer, and over medium voltage power lines coupled to the external low voltage power lines.

Besides broadband over power line (e.g., PLCS communications), there are other internal power line data applications. For example, in-home power line communication local area networks are becoming popular. Using internal power lines, computers, AV recording devices, IP telephones, stereos and other in-home communication devices may form an in-home power line communication local area network ("PLC LAN"). Thus, the internal low voltage power lines may carry PLC LAN signals, which undesirably may propagate onto external low voltage power lines.

Accordingly, the low voltage power lines may carry PLCS communications and PLC LAN communications. These two types of communications may use overlapping frequency bands. It is noted that the premises having a PLC LAN may not be a subscriber premises for the PLCS. As a result, a bypass device (or other PLCS communication device) that is nearby (or is coupled to) the same low voltage power line to which an in-home PLC LAN is used, may be exposed to those PLC LAN communications (which are not PLCS communications or intended for the bypass device).

Consider the example where non-subscriber PLC LAN data signals and subscriber PLCS data signals propagate to the same bypass device. A potential problem occurs when non-subscriber PLC LAN signals and subscriber PLCS data signals are in the same frequency band and arrive at the bypass device at an overlapping time period. In such example, the PLC LAN signals may be perceived as noise by the bypass device, thereby decreasing the signal-to-noise ratio (SNR) of received PLCS data signals. Thus, the PLC LAN data signals may degrade or even prohibit the upstream PLCS communications from the PLCS subscriber premises.

Repeaters have been used to increase the SNR of data signals. However, because repeating may sometimes cause latency and lower the overall data rate, they can be undesirable in many applications, which may include communicating video data, telephony data, and other latency sensitive and/or data rate sensitive applications. Additionally, repeating all data (e.g., upstream and downstream), when satisfactory communications may be achieved without such repeating, may not provide efficient utilization of the infrastructure. In other words, repeating data less, such as only when certain conditions are satisfied, certain triggering event detected, or only in one direction, may increase the efficiency of the network and allow for improved performance.

Accordingly, one or more of the embodiments of the present invention may overcome one or more of these challenges to power line communication systems and provide an improvement over these or other power line communication systems.

SUMMARY OF THE INVENTION

The present invention provides a power line communication device and method configured to facilitate communications over a low voltage power line between a downstream user device and an external power line communication device. In one embodiment, the device may include a communication module configured to communicate over a low voltage power line and a controller configured to control the module. The controller is configured to operate the module in a first configuration in which all repeating is disabled; and a second configuration wherein upstream repeating is enabled and downstream repeating is disabled. The controller may transition from the first configuration to the second configuration in response to a command received via the low voltage power line or upon determining that a triggering event has been detected such as an unacceptable data rate, error rate, or noise detection. In some embodiments, the device may form part of a utility meter and also transmit utility data to the power line communication device.

The invention will be better understood by reference to the following detailed description taken in conjunction with the accompanying drawings.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings:

FIGS. 5A-5B are flow charts of example processes performed by an example repeater to activate and deactivate repeating operations.

DETAILED DESCRIPTION OF ILLUSTRATIVE EMBODIMENTS

In the following description, for purposes of explanation and not limitation, specific details are set forth, such as particular networks, communication systems, computers, terminals, devices, components, techniques, data and network protocols, software products and systems, PLCS, enterprise applications, operating systems, development interfaces, hardware, etc. in order to provide a thorough understanding of the present invention.

However, it will be apparent to one skilled in the art that the present invention may be practiced in other embodiments that depart from these specific details. Detailed descriptions of well-known networks, PLCS, communication systems, computers, terminals, devices, components, techniques, data and network protocols, software products and systems, operating systems, development interfaces, and hardware are omitted so as not to obscure the description of the present invention.

Figure 1:
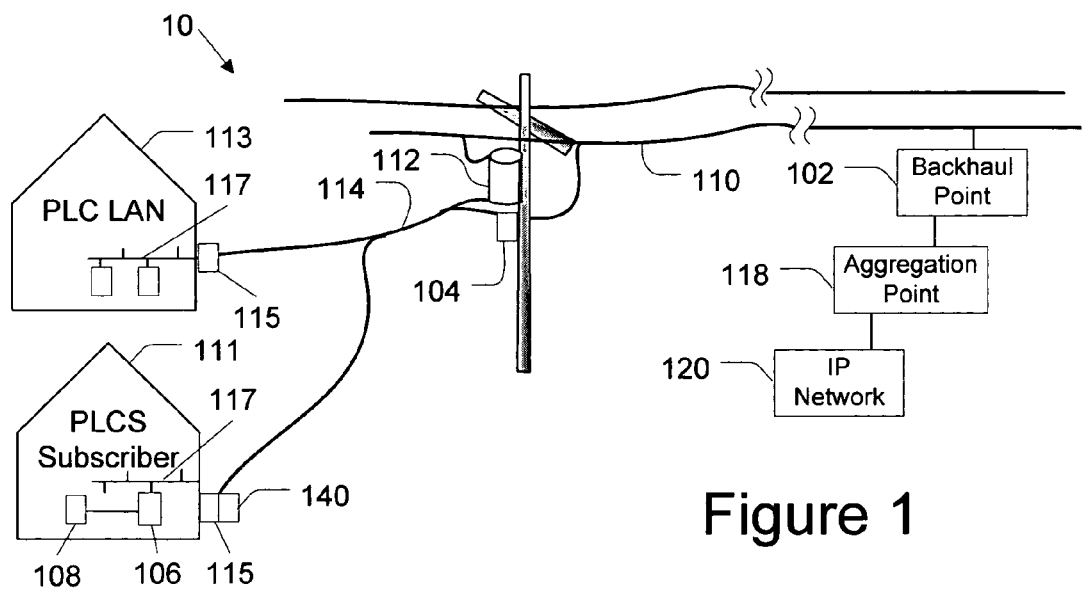
FIG. 1 is a block diagram of a portion of a power line communication system and power line communication LAN.

One example of a portion of a PLCS 10 is shown in FIG. 1, which includes a backhaul point 102, a bypass device 104, a power line modem 106, and a low voltage (LV) power line repeater 140. User devices 108 at PLCS subscriber premises 111 may communicate with bypass device 104 via internal power lines 117 and external power lines 114. The PLCS may be coupled to an internet protocol (IP) network 120 (e.g., the Internet). Other embodiments may include additional or different network elements.

Communications between a backhaul point 102 and bypass device 104 may occur via medium voltage (MV) power lines 110 or other medium such as a coaxial cable, fiber optic conductor, or twisted pair (e.g., for DSL communications). Typical voltage levels on the MV power lines 110 range from about 1000 V to about 100 kV. Communications between a bypass device 104 and a power line modem 106 occur via low voltage (LV) power lines 114. Typical voltage levels on LV power lines 114 range from about 100 V to about 240 V. A user device 108 may access the PLCS 10 through the power line modem 106. A LV power line repeater 140 may repeat upstream and/or downstream communications onto the LV power lines 114, 117. Although only a small portion of the PLCS is depicted, many bypass devices 104 may be coupled to a backhaul point 102. Also, a bypass device 104 may be coupled to a plurality of subscriber premises via LV power lines 114. Thus, many PLCS subscriber premises 111 may be served by a single bypass device 104. Zero or more repeaters 140 may be located along any external LV power line 114 between any subscriber premises 111 and the bypass device 104. Zero or more repeaters 140 may be coupled to internal LV power lines 117.

The backhaul point 102 serves as an interface and gateway between the MV power line and a traditional non-power line telecommunications network. In various embodiments one or more backhaul points 102 may be communicatively coupled to an aggregation point (AP) 118 that in many embodiments may be at (e.g., co-located with), or connected to, a point of presence to an IP protocol network 120. The backhaul point 102 may be connected to the AP 118 using any available mechanism, including fiber optic conductors, T-carrier, Synchronous Optical Network (SONET), or wireless techniques well known to those skilled in the art. Thus, the backhaul point 102 may include a transceiver suited for communicating through the communication medium that comprises the backhaul link.

The bypass device 104 may receive or transmit communications via the MV power line 110. In particular, the bypass device 104 facilitates bypassing transformers 112 by providing a bi-direction communication path between the MV power lines 102 and the LV power lines 114. Otherwise such communications would be attenuated as they propagate through the transformer 112. Thus, the bypass device 104 is coupled to an LV power line 114 to serve an LV power line subnet, (i.e., the LV power line 114 connected to the distribution transformer 112 and the devices (e.g., power line modems 106) that are coupled to the LV power lines 114, 117). The bypass device 104 also may be configured as an MV repeater that is operable to repeat PLCS communications along MV power lines 110.

Accordingly, the bypass device 104 may receive communications from the MV power line 110 and transmit such communications onto the LV power line 114 to one or more user devices 108 coupled to the LV power line subnet. Further, the bypass device 104 may receive communications from such user devices 108 via the LV power lines 114, 117, and transmit such communications onto the MV power line 110. The bypass device 104 also may provide communication services for PLCS subscribers. Such services may include security management, routing of Internet Protocol (IP) packets, filtering of data, access control, service level monitoring, signal processing and modulation/demodulation of signals transmitted over the power lines. Further details regarding the bypass device 104 are included below in a separate section.

The power line modem (PLM) 106 may plug into a power outlet to allow user devices 108 to communicate with the bypass device 104 via the internal LV power lines 117 and external LV power lines 114. The PLM 106 thus serves as an interface for user devices 108 to access the PLCS 10. For data received from the bypass device 104 (or LV power line repeater 140), the PLM 106 demodulates the data, and then transmits the data to the user device 108. For data received from a connected user device 108, the PLM 106 formats, modulates, and transmits the data in a signal suitable for transmission along the low voltage power lines 114, 117. Various data formats and modulation schemes may be used. For example, the HomePlug® Alliance has developed a standard (e.g., HomePlug 1.0, Turbo, and AV) for communicating over low voltage power lines. For convenience, the system will be described using the HomePlug standard (which may include HomePlug 1.0, Turbo, or AV), but other standards and schemes may be used for communication over low voltage power lines.

A variety of user devices 108 may access the PLCS 10 from one or more subscriber premises 111. A user device 108 may include any device capable of either one or both of supplying data for transmission and/or receiving data. Examples of user devices 108 that may include, but are not limited to a computer, a router, local area networks, a telephone, a telephone answering machine, a fax machine, a digital cable box (e.g., for processing digital audio and video, which may then be supplied to a conventional television and for transmitting requests for video programming), voice-over IP endpoints, game systems, a stereo, a videophone, a television (which may be a digital television), a video recording device (which may be a digital video recorder), a home network device, a security system, an alarm system (e.g., fire, smoke, water, carbon dioxide, etc.), a direct load control switch, a power utility meter, other types of utility meters, utility distribution automation equipment, and other devices.

In some embodiments, the power line modem (PLM) 106 may be integrated with the user device 108. In addition and as discussed herein, the functions of the PLM 106 may be integrated into a smart utility meter such as a gas meter, electric meter, water meter, or other utility meter to thereby provide automated meter reading (AMR).

The PLCS 10 also may include LV power line repeaters 140, such as indoor low voltage repeaters and outdoor low voltage repeaters. The repeater 140 is discussed briefly here and in more detail below. An example indoor low voltage repeater may be plugged into a wall socket inside the customer premises. Such indoor LV repeater is coupled to the internal power lines 117. An example outdoor low voltage repeater may be coupled to the external low voltage power line 114 conductors extending from the transformer 112. For example, an external LV power line repeater may be located at or near a power utility meter 115 which serves a PLCS subscriber premises 111. Both the indoor low voltage repeaters and outdoor low voltage repeaters may repeat data (receive and re-transmit data) onto the low voltage power lines to extend the communication range of the bypass device 104 and the power line modems 106.

The PLCS 10 also may include a power line server (PLS) (not shown), which may be embodied, for example, by a computer system with memory for storing a database of information about the PLCS and which includes a network element manager (NEM) for monitoring and controlling the PLCS 10. The PLS allows network operations personnel to provision users and network equipment, manage customer data, and monitor system status, performance and usage. The PLS may reside at a remote network operations center (NOC), and/or at a PLCS Point of Presence (POP), to oversee a group of communication devices via the Internet. The PLS may provide an Internet identity to the network devices by assigning the devices (e.g., user devices, repeaters 140, bypass devices 104, (e.g., the LV modems and MV modems of the bypass devices), backhaul points 102, and AP 118) IP addresses, and storing the IP addresses and other device identifying information (e.g., the device's location, address, serial number, etc.) in its memory. In addition, the PLS may approve or deny user device authorization requests, request status reports, statistics and measurements from the bypass devices 104, and backhaul points 102, and provide application software upgrades to the communication devices (e.g., bypass devices, backhaul points, and other devices). The PLS, by collecting electric power distribution information and interfacing with utilities' back-end computer systems may provide enhanced power distribution services such as automated meter reading, outage detection, restoration detection, load balancing, distribution automation, Volt/Volt-Amp Reactance (Volt/VAr) management, and other similar functions. The PLS also may be connected to one or more aggregation points 118 and/or core routers directly or through the Internet and therefore can communicate with any of the backhaul points 102, bypass devices 104, repeaters 140, power line modems 106, and user devices 108 through the respective AP 118 and/or core router.

Communication among the power line communication devices may occur using a variety of protocols, such as, for example, a Internet Protocol. One example embodiment employs a HomePlug standard (i.e., the signal set in the same or different frequency band defined by the standard) for communications among the devices. Another example, includes time division multiple access (TMDA) and yet another may use frequency division multiplexed (FDM) communications. In one embodiment a broadband communication system is implemented in which the communication devices implement one or more layers of the 7 layer open systems interconnection (OSI) model.

For downstream communications, data from the IP protocol network 120 is transmitted through the aggregation point 118 and eventually enters arrives at the backhaul point 102. The backhaul point 102 receives the communication and transmits the data over the MV power lines 110. The communication propagates to a bypass device 104 which may receive then transmits the communication further along the MV power line 110. A bypass device 104 also may recognize the communication as being destined for a user device 108 within the LV subnet served by such recognizing bypass device 104. Such bypass device then transmits the PLCS communication over the LV power line 114. The PLCS communication then may be received at one or more power line modems which in turn provide the data to the destination user device 108. Zero or more repeaters 140 may be located along the path between the bypass device 104 and power line modems 106 to repeat the communication along its path.

A description of the communications occurring along the LV power lines are further described below in a separate section—LV Power Line Communication Process.

A detailed description of an example PLCS, its components and features is provided in U.S. patent application Ser. No. 11/091,677 filed Mar. 28, 2005, entitled "Power Line Repeater System and Method," which is hereby incorporated by reference in its entirety. A detailed description of another example PLCS, its components and features is provided in U.S. patent application Ser. No. 10/973,493 filed Oct. 26, 2004, entitled "Power Line Communications System and Method of Operating the Same," which is hereby incorporated by reference in its entirety. The present invention may be used with networks as described in the above patent applications or others. Thus, the invention is not limited to a particular PLCS, PLCS architecture, or topology and may be used in both overhead and underground LV power lines and/or MV power lines.

Bypass Device

In an exemplary PLCS a bypass device 104 may be located at or near each distribution transformer 112. This example bypass device 104 is communicatively coupled to the backhaul point 102 via the MV power lines 110 and is communicatively coupled to power line modems (PLMs) 106 and LV repeaters 140 via the LV power lines 114, 117. The bypass device 104 services the user devices 108 coupled to the PLMs 106 of an LV power line subnet. The external LV power lines 114 extend to the utility subscriber premises. Internal LV power lines 117 typically then extend from the external power lines to power outlets and to directly-wired utility devices. The line of demarcation between internal and external power lines may vary with the structure and may comprise the power meter, the circuit breaker box, and an electrical panel. Some structures may not include a physical structure or device where the power lines enter the premises. The PLMs 106 may plug directly into a power outlet and be coupled to a user device 108. Thus, the bypass device 104 may communicate with a user device 108 along a path formed by the external low voltage power lines 114, the power meter 115, the internal power lines 117 and the power line modem 106.

Figure 2:
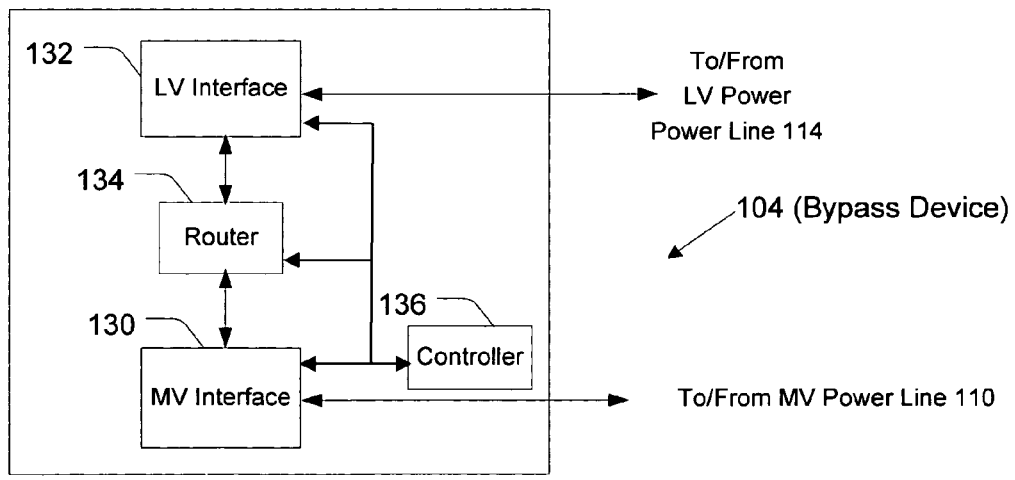
FIG. 2 is a block diagram of an example embodiment of a bypass device.

FIG. 2 shows an example embodiment of the bypass device 104. The bypass device 104 may include an MV interface 130, an LV interface 132, a router 134 and a controller 136. In some embodiments the controller 136 may also serve as the router, performing the router functions. The MV interface 130 couples the bypass device 104 to the MV power line 110 and may include a modem, amplifier, filter, frequency translation circuitry, transmit/receive switch, transient voltage protection circuitry, and a coupler. The LV interface 132 couples the device 104 to the LV power line 114 and may include a modem, amplifier, filter, frequency translation circuitry, transient voltage protection circuitry, transmit/receive switch, and a coupler. The router 134 routes data along an appropriate path (e.g., onto the MV power line via the MV interface; onto the LV power line via the LV interface, to the controller 136). The router 134 may perform a variety of other functions, including: match data packets with specific commands, messages, and destinations; perform traffic control functions; and perform usage tracking functions, authorizing functions, throughput control functions and other routing and communications services. The controller 136 controls operations of the bypass device 104, receives and responds to control commands from the power line server, and may perform one or more of the routing functions described herein or others (i.e., the function of the router may be performed by the controller 136). Router (and routing), as used herein, is meant to include a router, switch, or bridge and their associated functions.

LV Power Line Repeater

Figure 3:
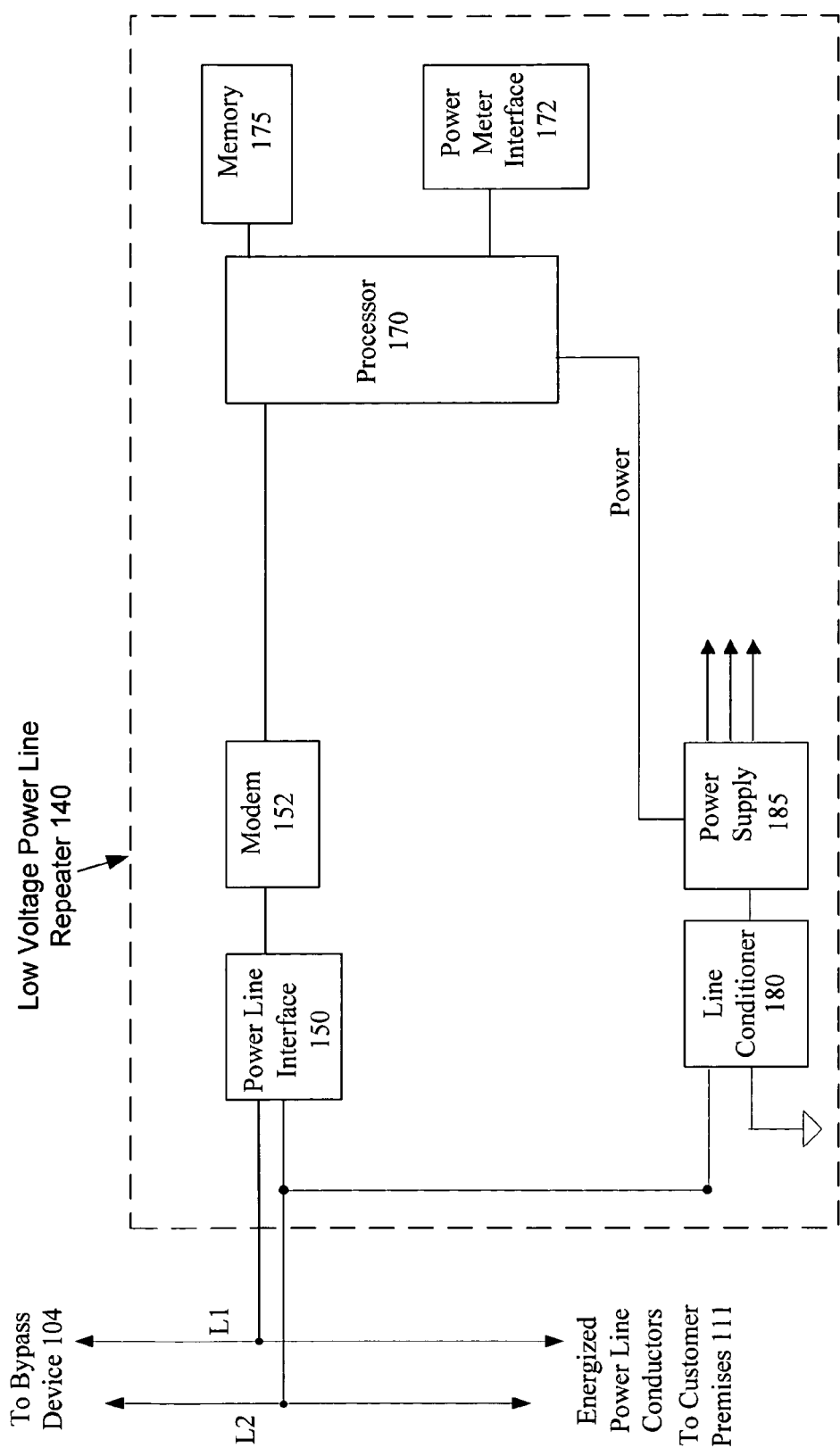
FIG. 3 is a block diagram of an example embodiment of a low voltage power line repeater.

FIG. 3 shows an embodiment of a LV power line repeater 140 that may provide repeating of some power line communication system (PLCS) communications. PLCS communications propagating along an LV power line propagate from a power line modem (PLM) 106 to bypass device 104, or from a bypass device 104 to a PLM 106. To avoid signal degradation of a PLCS communication propagating along an LV power line, an LV power line repeater 140 may receive and repeat the communication repeat (e.g., receive, demodulate, decrypt, decode, encode, encrypt, re-modulate, and transmit the data) on the LV power line. For example, upstream communications originating at a user device 108 and transmitted onto the internal LV power lines 117 via the PLM 106 may be received at the LV power line repeater 140, which in response may repeat the upstream communication onto LV power lines 114 for reception by the bypass device 104. Similarly, downstream communications transmitted over an LV power line subnet by a bypass device 104 may be received by the LV power line repeater 140, and repeated onto the LV power lines for reception by the PLM 106 and destination user device(s) 108. In some embodiments the LV power line repeater 140 is an external repeater located at a power utility meter 115, at a utility pole, or along the external LV power lines 114. In other embodiments the LV power line repeater 140 is an internal repeater plugged into a wall socket to connect to the internal LV power lines 117.

FIG. 3 depicts an example LV power line repeater 140 that provides repeating of some power line communication data (user data) and facilitates automated reading of a utility meter (e.g., power utility meter, gas meter, water meter). This example embodiment may be integrated into or form part of the utility meter. In one example embodiment, the repeater 140 may be implemented on a circuit card that is inserted into an electronic utility meter. In other embodiments, all or part of the repeater 140 may be disposed in a meter collar.

The LV power line repeater 140 embodiment of FIG. 3 includes a power line interface 150 which is coupled to a modem 152. Power line interface 150 may include impedance matching circuitry, a bandpass filter, an amplifier, power signal isolation circuitry, transmit and receive switch circuitry, and other conditioning circuitry. As shown, power line interface 150 may be coupled to both energized conductors L1 and L2 and may transmit data by differentially coupling the data signals onto the power line conductors (e.g., via a transformer therein) and similarly receiving the data. In addition, the power line interface 150 may provide frequency translation. While this embodiment communicates over two energized power line conductors, other embodiments may communicate over one energized conductor or three energized conductors (three phase service).

The modem 152 may be a HomePlug compliant or compatible modem (e.g., substantially compliant or compatible with HomePlug 1.0, Turbo, or AV) and employ OFDM for communications over the power lines. The modem 152 is communicatively coupled to the processor 170. The processor 170 may be in communication with memory 175, which may include volatile and non-volatile random access memory (RAM) which may be used to store utility metrology data, including usage data collected from the utility meter and program code to be executed by the processor 170. Other utility metrology data (or referred to herein as utility data) may include, but is not limited to Voltage (peak/average/threshold) data, Current (peak/average/threshold) data, power factor data, phase angle data, peak power data, average power data, voltage sag data, voltage swell data, neutral current data, peak reverse power data, and average reverse power data. As will be evident to one skilled in the art, some of these data types may comprise raw measurements and others may be derived from raw measurement data. Additionally, the measured or derived values of one or more of these may cause the processor 170 to generate (and transmit) an alert such as an Alert on detection of an out of limit for reverse power, voltage sag, voltage swell, voltage (too high or low), etc. Other embodiments may include two modems 152, with the first and second modem communicating with a user device and bypass device, respectively, and using a different frequency band or a different encryption key for communications.

New program code may also be received via the energized conductors (e.g., the external power line conductors) from a network element, such as a bypass device 104 of the PLCS 10. The new code may then be stored in flash memory for execution by the processor 170. The repeater 140 may be configured to enable or disable repeating of power line communications (in either or both directions) via a command from a network element, such as a bypass device, of the PLCS. The enabling or repeating of PLC data may thus be achieved by the processor 170 executing program code and in response to receiving a command.

The processor 170 may also be in communication with the meter via a power meter interface 172 in order to receive data and perform other automated meter reading processes. A power supply 185 may coupled to the processor 170, modem 152, and other components to provide power thereto. The power supply 185 may be connect to the power lines via a line conditioner 180. In another embodiment the power may be supplied by the meter into which the module 140 is inserted.

The utility data (e.g., power usage data) may be received by the repeater 140 and transmitted via the LV power line to a power line communications system network element, which may be, for example, a transformer bypass device 104. The network element may then transmit the utility data (e.g., via the MV power line) to an upstream device (e.g., a backhaul device 102), which further transmits the utility data upstream for eventual reception by the utility provider. Additionally, the repeater 140 may receive user data from the bypass device 104 and transmit the data over the LV power line 114 for reception by one or more user devices 108 in the customer premises. Similarly, the repeater 140 may receive user data from one or more user devices 108 in the customer premises and transmit the user data over the LV power line 114 to the bypass device 104 or other network element.

In operation, data signals will be received from the LV power line via line interface 150. After conditioning by line interface 150, the signals will be provided to modem 152. However, if a data packet received by modem 152 does not have a destination address (e.g., media access control address or IP address) that corresponds to modem 152, the data packet may be ignored. In other instances, the data signals received by the modem 152 may have been encrypted by the transmitting device. If the modem has the correct encryption key, the modem may successfully decrypt the data packets. However, if the modem 152 does not have the correct encryption key, the modem 152 will not be able to successfully decrypt the data packet and the data may be ignored. A first encryption key may be used for communications between the repeater 140 and user devices 108 and a second encryption key may be used for communications between the repeater 140 and its network element (e.g., bypass device 104). The processor 170 may control which encryption keys modem 152 uses. If the packet is not correctly addressed and/or encrypted, the data may be discarded and not repeated by repeater 140. Other means of selectively repeating the data may also be employed.

There are various reasons for employing selective repeating and/or isolation (e.g., multiple encryption keys). If communications between the bypass device 104 and the user device 108 are not reliable, the user device may sometimes receive data from the bypass device. If the repeater 140 is repeating all data packets, it is possible that the user device (or the bypass device) may receive the same packet twice (transmitted once from the repeater 140 and once from the bypass device 104), which would likely cause an error. To prevent this occurrence, the bypass device 104 and the user devices 108 (i.e., their power line modems) may use different encryption keys for communications on the LV power line 114. This creates a logical isolation of the internal and external networks. Additionally, the bypass device may communicate with a plurality of user devices in different customer premises, which are electrically connected by the LV power lines. Using a different encryption key for each customer premises ensures that user devices in one customer premises cannot receive data transmitted by or to user devices in another customer premises.

In an alternate example embodiment, LV power line communications among the bypass device 104 and the user devices 108 (i.e., their power line modems 106) may use different frequency bands. In this embodiment, the power line interface 150 may include frequency translation circuitry for translation from the 4-21 MHz band to the 30-50 MHz band. Thus, in this embodiment, Homeplug compatible data signals (e.g., Homeplug 1.0, HomePlug Turbo, or Homeplug AV) between the repeater 140 and user devices 108 may use the 30-50 MHz band and communications between the repeater 140 and the bypass device 104 may use the 4-21 MHz (or vice versa). Thus, because they communicate in different frequency bands, the user devices and the bypass device cannot "accidentally" communicate with each other. In this embodiment, the power line interface 150 may have two different input and output filters (one for each band) and two frequency translation circuits—one for upbanding the output of the modem to the higher frequency band and one for downbanding the input of the higher frequency to the modem's native frequency band. This embodiment may be implemented by having the processor 170 control the frequency band at which the power line interface 150 communicates. Alternately, if a modem that supported two frequency bands is used, processor 170 may control the frequency used by modem 152. The modem 152 could also communicate via its native frequency or frequencies.

In the first embodiment, if repeating is enabled, and the data packet is successfully decrypted, the demodulated data packet is supplied to the processor 170. Processor 170 may process the data packet(s) and, if the packet contains a command, may perform one or more activities. Such commands and associated activities may include transmit utility data, update schedule of transmissions of utility data, disable upstream repeating, enable upstream repeating, disable downstream repeating, enable downstream repeating, disable all repeating, enable all repeating, receive and store new program code, store new IP address, and others. Processor 170 may determine a data packet includes a command by any suitable method such as identify packets having a destination address (e.g., media access control (MAC) or IP address) corresponding to that of repeater 140, which is stored in memory 175. If the packet is not a command, the processor 170 may supply the same received data packet back to the modem for transmission onto the LV conductors. In addition to supplying the data packet to the modem 152, the processor 170 also may supply information of the encryption key to be used to encrypt the data packet (or, in an alternate embodiment, information to control the frequency band of transmission). If repeating is disabled, the processor 170 does not supply the packet back to the modem 152. In an alternate embodiment, data may be addressed by each device (i.e., the repeater 140, bypass device 104, and user device/PLM) so that only the desired device receives the data. In this example, the data received by the processor 170 from modem 152 also may be re-addressed by processor 170 with the destination address (e.g., MAC address and/or IP address) of the bypass device 104 or the user device that corresponds to the destination address of the data packet. Thus, the processor 170 may include router (or bridge or switch) functionality.

LV Power Line Communication Process

Power line communications systems (PLCS) are becoming a common way of delivering internet broadband services to user premises. Communications over power lines, however, also are common for in-home local area networks (e.g., HomePlug®). It is noted that the premises having a PLC LAN may not be a subscriber premises for the PLCS. Accordingly, the internal 117 power lines and nearby external LV power lines 114 may carry PLCS communications and PLC LAN communications. As a result, a bypass device (or other PLCS communication device) that is nearby or is coupled to the same LV power line to which an in-home PLC LAN is connected, may undesirably receive PLC LAN communications (which are not PLCS communications or intended for the bypass device).

When PLC LAN signals (e.g., PLCS non-subscriber) and PLCS communications (e.g., PLCS subscriber) operate in the same or overlapping frequency bands, communications of each will sometimes arrive at the bypass device 104 in overlapping time periods. As a result, the PLC LAN signals may adversely impact PLCS communications. Specifically, the PLC LAN signals may constitute noise at the bypass device, thereby decreasing the signal-to-noise ratio (SNR) of received PLCS communications. Thus, the PLC LAN communications may degrade or even prohibit the upstream PLCS communications originating from the PLCS subscriber's premises.

To improve the PLCS communications within an LV power line subnet, one or more repeaters 140 may be positioned within the LV power line subnet. As previously described, one or more LV power line repeaters 140 may be located along the external LV power lines 114 (such as at utility meter 115). Alternatively, or in addition, one or more LV power line repeaters may be coupled to the internal LV power lines 117. The PLCS data signals received by the bypass device 104, having been repeated by the repeater, will generally have a higher signal to noise ratio (as compared to data signals transmitted from a PLM that have not been repeated) and may facilitate improved performance and a higher data rate.

In one example embodiment, the repeater 140 may be configured to repeat only upstream communications (i.e., toward the bypass device 104), only downstream communications (i.e., from the bypass device 104), both upstream and downstream communications, or neither upstream nor downstream communications. Thus, repeater 140 may have four states. The configuration of the repeater 140 may be changed dynamically in response to commands from the bypass device or in response to conditions detected by the repeater itself. Such a versatile device may provide numerous benefits in some scenarios.

For example, as the PLC LAN communications propagate along the external LV power lines 114 toward the bypass device 104, the signals also may propagate onto other external LV power line extending toward another premises. In such instance the PC LAN signals have traveled upstream, then travel downstream toward the other premises. In many instances such downstream PLC LAN communications may degrade downstream communications destined for such other premises. In such case downstream and upstream repeating operations may be activated. However, in many instances the PLC LAN signal may have attenuated enough so as not to adversely impact the downstream PLCS communications received at the PLM 106 from the bypass device 104. Accordingly, in some configurations upstream communications may be repeated, while downstream communications are not repeated.

Because repeating may cause latency and lower the overall data rate, not repeating downstream communications may allow for an increase in data rate and reduced latency of downstream communications, which may be especially advantageous for downloading video data, telephony data, and other latency sensitive and/or data rate sensitive applications. Additionally, repeating all data (e.g., in both directions) may not provide efficient utilization of the infrastructure. In other words, repeating data less, such as only when certain conditions are satisfied, certain triggering event detected, or only in one direction, increases the efficiency of the network and may allow for improved performance. The repeater 140 may use any suitable method to determine whether a communication is an upstream communication or a downstream communication, including, but not limited to, (1) determining if the source address of a data packet corresponds to the bypass device (indicates downstream communication), (2) determining whether the destination address corresponds to the bypass device 104 (indicates an upstream communication). Alternately, the repeater 140 may determine whether a data packet is an upstream or downstream communication based on the frequency of the received data signal or the encryption key used to decrypt the data.

The repeaters 140 coupled to an LV power line subnet may receive commands from the bypass device 104 serving that LV power line subnet. Accordingly, there may be processes occurring at the bypass device 104 and at the repeaters 140 to implement the LV power line communication processes. For example, the bypass device 104 may monitor noise on the LV power lines and may monitor incoming communications. The repeaters 140 may monitor communications along the LV power lines, receive commands from the bypass device 104, communicate utility data, and perform communication repeating functions.

Other low voltage repeaters may also be used to implement one or more embodiments of the present invention. A detailed description of other example repeaters, their components, and features is provided in U.S. patent application Ser. No. 11/341,646 filed Jan. 30, 2006, entitled "Power Line Communications Module and Method," which is hereby incorporated by reference in its entirety.

Figure 4B:
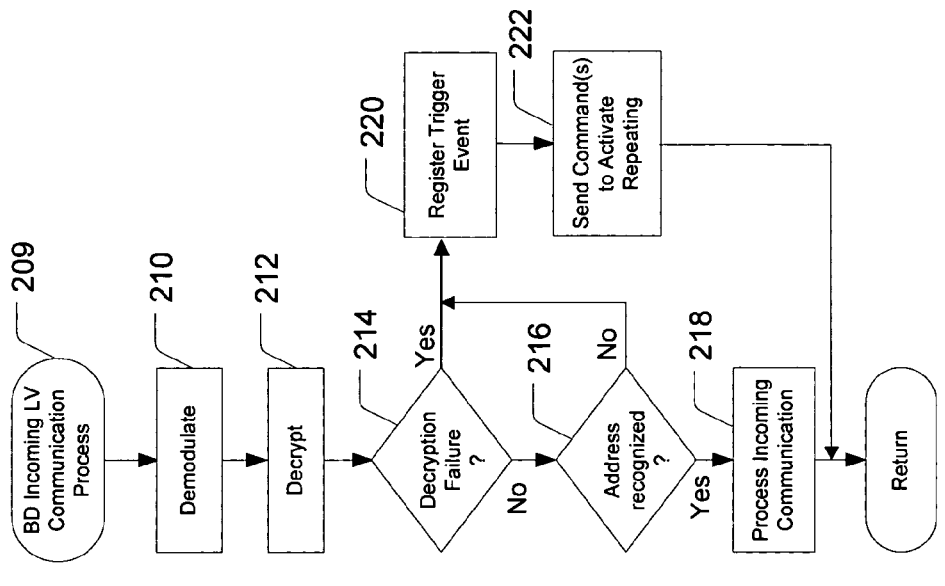
FIGS. 4A-4B are flow charts of example processes performed by an example bypass device to control repeating operations.
Figure 4A:
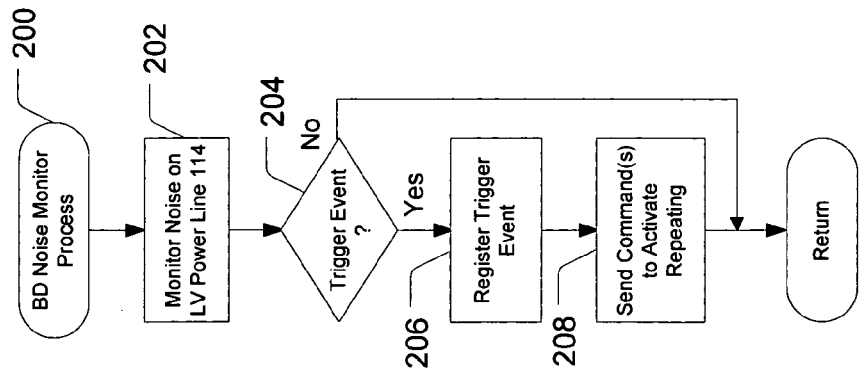

FIGS. 4A-4B are embodiments of processes performed by a bypass device 104 to control repeating operations along an LV power line subnet. FIGS. 5A-5B are directed to processes for activating LV power line repeating operations.

FIG. 4A is directed to a process 200 for monitoring noise on a LV power line 114 by a bypass device. The process is performed periodically or aperiodically. At step 202 the LV power line 114 is monitored to detect noise. In one embodiment, the bypass device controller 136 monitors communications to detect a pattern indicative of a PLC LAN (e.g., sometimes very good reception and sometimes very bad reception). Such a pattern may be treated as a triggering event. In another embodiment a digital signal processor or analog to digital converter may be included in the bypass device 104 to measure noise as directed by controller 136. If the measured noise meets select criteria, then the measured noise may be treated as a triggering event. The select criteria, for example, may include the measured noise (i) fitting a predefined pattern such as a temporal pattern, (ii) being confined sharply within a particular frequency band, and/or (iii) being substantially confined and/or substantially co-extensive within a known frequency band (e.g., that of a HomePlug or other standard's band). If testing at step 204 reveals a triggering event, then at step 206 the triggering event may be registered and logged as a triggering event. The time of such registration is noted. At step 208 the bypass device 104 then transmits a command via the LV power lines to one or more LV power line repeaters 140 instructing such repeaters to activate repeating operations. As discussed, the command, in some instances, may be to only repeat upstream data communications, only downstream communications, or to repeat both upstream and downstream communications.

FIG. 4B is directed to a process 209 for handling incoming communications at a bypass device 104. The bypass device 104 receives communications at the LV interface 132 (see FIG. 2). The LV interface 132 may include a modem which demodulates the communication at step 210. A decryption process then commences at step 212. If the communication is a PLC LAN communication for a LAN at a non-PLCS subscriber's premises, then the decryption key may be unknown to the bypass device 104. Accordingly, the decryption process may fail. Alternately, the demodulated data packet may have a destination address and/or source address that is not recognized by the bypass device 104. If at step 214 the decryption process fails, or at step 216 an address is not recognized, then a trigger event is registered and logged at step 220. The bypass device 104 may transmit commands at step 222 to one or more LV power line repeaters 140 to activate repeating operations (e.g., activate upstream communications). If instead, the communication address is recognized and the decryption is successful, then at steps 216 and 218, the bypass device processes the incoming communication, (e.g., receives the data packets and transmits the data packet in another communication onto the MV power lines toward a backhaul point 102).

In an example embodiment, the bypass device 104 may activate an individual repeater 140 among a group of repeaters 140 within a given LV subnet or all repeaters 140 among a group of repeaters 140 within the given subnet. Thus, degraded PLCS communications may be improved within an LV power line subnet.

After activating repeating by one or more repeaters, the bypass device may continue to monitor the LV power line and deactivate the repeating operations if, for example, no triggering event occurs after a predetermined time. If the most recent trigger event was more than a threshold amount of time in the past, then repeating operations may be de-activated and the bypass device 104 may transmit commands to one or more repeaters to disable the repeating operations.

FIG. 5A shows a process for self-activating the repeating operations at a LV power line repeater 140, which may be implemented via execution of executable program code stored in memory 175 by the processor 170 of the repeater 140. Periodically, a process 230 may be performed in which LV power line communication signals are monitored at step 232. A communication signal is demodulated at step 234. A data rate is determined for receiving the communication. In addition or alternately, an error rate for the received communication may be determined. Other triggering events or parameters may be determined or monitored in other embodiments. At step 236 the data rate and/or error rate may be compared with acceptable thresholds. If the data rate is less than a threshold bit rate, or if the error rate exceeds a threshold error rate, then at step 238 the repeater self-activates to perform repeating operations. In one example embodiment, the repeater 140 remains active until the bypass device 104 sends a command instructing the repeater 140 to de-activate or, like the process described for the bypass device, deactivates itself a predetermined time after monitoring a threshold error rate or data rate.

FIG. 5B shows a flow chart of command processing 240 by the processor 170 of repeater 140. The repeater 140 may receive a communication from the bypass device 104. The communication is demodulated and may be processed to determine whether the repeater is the destination address. If the repeater 140 is the destination, then the communication is processed as a command. For the instance where the command is to activate upstream repeater operations, at step 242 the upstream repeating operations are activated. For the case where the command is to activate downstream repeater operations, at step 244 the downstream repeating operations are activated. For the case where the command is to de-activate upstream repeater operations, at step 246 the upstream repeating operations are de-activated. For the case where the command is to de-activate downstream repeater operations, at step 248 the downstream repeating operations are de-activated. In addition, a command may be received to activate repeating for both upstream and downstream communications. Similarly a command may be received to deactivate both upstream and downstream communications. Finally, while generally a power line communication channel will be symmetric (e.g., due to attenuation), localized noise may degrade reception at a device which does not affect the other device. One or more examples of the present invention may be used to overcome and/or reduce the affects of such localized noise or other interference. Thus, the repeater of some embodiments of the present invention could also be used to repeat only downstream communications. For example, the user device (or PLM) could be configured to periodically monitor for degraded reception performance, and, in response, transmit a request for downstream repeating to the repeater or bypass device (which may transmit a command to the repeater).

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

What is claimed is:

1. A method of providing communications between one or more user devices and an external power line communication device via low voltage power lines that include internal low voltage (LV) power lines and external low voltage power lines, the method comprising:
   determining that communications over the low voltage power line are degraded; and
   enabling repeating of data received from the one of one or more user devices on the low voltage power lines.

2. The method of claim 1, wherein repeating of data received from the external power line communication device is not enabled.

3. The method of claim 1, wherein said determining is performed by the external power line communication device, and wherein said enabling comprises transmitting a command from said communication device to activate repeating.

4. The method of claim 1, further comprising subsequent to said enabling:
   receiving data from a power line modem that received the data from a user device;
   transmitting the data over the low voltage power lines; and
   receiving the transmitted data at the external power line communication device.

5. The method of claim 1, further comprising subsequent to said enabling:
   repeating upstream communications over the low voltage power lines; and
   not repeating downstream communications.

6. The method of claim 1, wherein said determining that communications are degraded comprises determining that upstream communications are degraded.

7. The method of claim 1, wherein said determining and enabling are performed by a low voltage power line repeater coupled to one of the internal low voltage (LV) power lines.

8. The method of claim 1, wherein said determining and enabling are performed by a LV power line repeater coupled to one of the external low voltage power lines.

9. The method of claim 1, further comprising:
   receiving utility usage data;
   storing the utility usage data; and
   transmitting the utility usage data to the power line communication device via one of the external low voltage power lines.

10. The method of claim 1, wherein said enabling comprises transmitting a command via the one or the external low voltage power lines to activate repeating.

11. The method of claim 1, wherein the one or more user devices are disposed in a plurality of customer premises; and wherein each customer premises includes a repeater associated therewith that is enabled for upstream repeating by said enabling step.

12. The method of claim 1, wherein said determining comprises determining that a data rate of communications is less than a threshold data rate.

13. The method of claim 1, wherein said determining comprises determining that an error rate of communications is greater than a threshold error rate.

14. The method of claim 1, wherein said determining comprises receiving a data packet with an unknown address.

15. The method of claim 1, wherein said determining comprises:
receiving a data packet; and
failing to decrypt the data packet.

16. The method of claim 1, wherein said determining comprises monitoring noise on an LV power line.

17. The method of claim 16, wherein said determining further comprises recognizing a noise pattern.

18. The method of claim 17, wherein said determining further comprises determining whether the noise is substantially confined within a frequency band.

19. The method of claim 17, wherein said determining further comprises determining that the noise is substantially co-extensive and substantially confined within a frequency band used by at least some in-home power line communication products.

20. A power line communication device configured to facilitate communications over a low voltage power line between a downstream user device and an external upstream device; comprising:
a communication module configured to communicate over the low voltage power line;
a controller configured to control said module;
wherein said controller is configured to operate said module in a first configuration in which repeating is disabled; and
wherein said controller is configured to operate said module in a second configuration wherein upstream repeating is enabled and downstream repeating is disabled.

21. The device of claim 20, further comprising:
a data port communicatively coupled to said controller; and
wherein said controller is configured to receive utility data via said data port and to cause said module to transmit said utility data over the low voltage power line.

22. The device of claim 20, wherein said controller is configured to operate said module in a third configuration wherein upstream repeating is enabled and downstream repeating is enabled.

23. The device of claim 20, wherein said controller is configured to operate said module in a third configuration wherein upstream repeating is disabled and downstream repeating is enabled.

24. The device of claim 20, wherein said controller transitions from the first configuration to the second configuration in response to a command received via the low voltage power line.

25. The device of claim 20, wherein said controller transitions from the first configuration to the second configuration in response to determining that a value of a parameter associated with a data signal received from the user device is unacceptable.

26. The device of claim 20, wherein said controller transitions from the first configuration to the second configuration in response to determining that a data rate is less than a threshold data rate.

27. The device of claim 20, wherein said controller transitions from the first configuration to the second configuration in response to determining that an error rate is greater than a threshold error rate.

28. A method of providing communications between one or more user devices and an external power line communication device via a low voltage power line, comprising:
enabling upstream repeating;
subsequent to said enabling upstream repeating,
receiving first data in an upstream communication via the LV power line;
transmitting the first data on the low voltage (LV) power line;
receiving second data in a downstream communication via the LV power line; and
not transmitting the second data on the LV power line.

29. The method of claim 28, further comprising:
disabling repeating; and
subsequent to said disabling,
receiving third data in an upstream communication via the low voltage power line; and
not transmitting the third data on the LV power line.

30. The method of claim 29, wherein said disabling is performed after a predetermined time period.

31. The method of claim 28, wherein said enabling is performed in response to detection of a trigger event.

32. The method of claim 28, wherein said enabling is performed in response to receiving a command.

33. The method of claim 28, wherein said enabling is performed by a communication device coupled to a medium voltage (MV) power line, and wherein said enabling comprises transmitting a command.

34. The method of claim 28, wherein said transmitting the first data on the LV power line comprises transmitting the first data on an internal low voltage power line.

35. The method of claim 28, wherein said transmitting the first data on the LV power line comprises transmitting the first data on an external low voltage power line.

36. The method of claim 28, further comprising:
receiving utility usage data;
storing the utility usage data; and
transmitting the utility usage data to the power line communication device via an external low voltage power line.

37. The method of claim 28, further comprising
determining that a data rate of communications on the LV power line is less than a threshold data rate; and
wherein said enabling is performed in response to said determining.

38. The method of claim 28, further comprising
determining that an error rate of communications on the LV power line is greater than a threshold error rate; and
wherein said enabling is performed in response to said determining.

39. The method of claim 28, further comprising:
enabling downstream repeating;
subsequently to said enabling downstream repeating,
receiving third data in a downstream communication via the LV power line; and
transmitting the third data on the LV power line.

* * * * *